(12) United States Patent
Graf et al.

(10) Patent No.: US 6,178,826 B1
(45) Date of Patent: *Jan. 30, 2001

(54) ELECTRODE ASSEMBLY FOR ELECTROMAGNETIC FLOW SENSORS

(76) Inventors: Oliver Graf, Vordermattenstrasse 8, CH-4447 Känerkinden; Michael Schoohf, Eggfluhstrasse 26, CH-4153 Reinach, both of (CH)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/358,784

(22) Filed: Jul. 22, 1999

Related U.S. Application Data

(60) Provisional application No. 60/100,709, filed on Sep. 17, 1998.

(30) Foreign Application Priority Data

Jul. 27, 1998 (EP) .................................................. 98114000

(51) Int. Cl.$^7$ .............................. G01F 1/58; G01D 21/00
(52) U.S. Cl. ...................................... 73/861.12; 73/866.5
(58) Field of Search ........................... 73/861.12, 861.13, 73/861.14, 861.15, 861.16, 861.11, 861.08, 866

(56) References Cited

U.S. PATENT DOCUMENTS

| | | |
|---|---|---|
| 3,177,709 | 4/1965 | Fischer . |
| 3,213,685 * | 10/1965 | Mannhertz et al. ............... 73/861.12 |
| 3,397,575 * | 8/1968 | Ham .................... 73/861.12 |
| 4,358,964 * | 11/1982 | Otsuka .............................. 73/861.12 |
| 4,517,846 | 5/1985 | Harrison et al. . |

FOREIGN PATENT DOCUMENTS

| | | |
|---|---|---|
| 0 766 069 | 4/1997 | (EP) . |
| 2 047 409 | 11/1980 | (GB) . |

* cited by examiner

*Primary Examiner*—Benjamin R. Fuller
*Assistant Examiner*—Jagdish Patel
(74) *Attorney, Agent, or Firm*—Bose McKinney & Evans LLP

(57) ABSTRACT

The electrode assembly (3, 3', 3") avoids the reduction of the insulation resistance of electrodes (4, 4', 41") by a suitable design. The assembly is part of an electromagnetic flow sensor comprising a tube (1, 1', 1") made of a metallic, nonferromagnetic material. The tube has an insulating liner (2, 2', 2"); an external surface (11) of the tube is untreated. Each electrode (4, 4', 4") has a head (41, 41', 41") and a shank (42, 42', 42") provided with a thread (43) and having a smaller diameter than the head. The electrode is fitted in hole (12) of the tube wall by means of an insulating body (5, 5', 5"). The body has a disk-shaped portion (51, 51', 51") and a tubular extension (52, 52', 52") fitting the hole. A cylindrical part (6, 6', 6") is made of an insulating, hydrophobic material and has a bottom (61) and a wall portion (62). The bottom (61) has an opening (63) with a diameter less than that of the portion (51, 51', 51"). The portion (62) has an inside diameter slightly greater than that of the portion (51, 51', 51"). The part (6, 6', 6"), the body (5, 5', 5") and a spring part (7, 7', 7"), in that order, are fixed by means of a nut (9, 9', 9") screwed onto the thread (43) of the shank. Therefore, the extension is fitted in the hole, and the disk-shaped portion and the bottom being supported on the external surface of the measuring tube.

11 Claims, 1 Drawing Sheet

ELECTRODE ASSEMBLY FOR ELECTROMAGNETIC FLOW SENSORS

This application claims benefit to provisional application Ser. No. 60/100,709 filed Sep. 17, 1998.

FIELD OF THE INVENTION

This invention relates to electrode assemblies for electromagnetic flow sensors.

BACKGROUND OF THE INVENTION

Electromagnetic flowmeters, as is well known, measure the volumetric flow rate of electrically conductive liquids. The measurement is based on Faraday+s law of induction. The liquid is passed through a magnetic field, so that a voltage is induced in it, which is taken off by means of at least two electrode assemblies.

The means for conducting the liquid in the form of a measuring tube, the means for generating the magnetic field, the electrode assemblies, and possibly further components form the electromagnetic flow sensor.

The inner surface of the measuring tube must, at least in the region of the magnetic field, be made of an insulating material in order that the induced voltage will not be short-circuited. Therefore, metallic measuring tubes are lined with a suitable insulating material.

Furthermore, metallic measuring tubes must not be made of ferromagnetic material, so that the magnetic field generated by means of a coil assembly disposed outside the measuring tube can reach and pass through the liquid. They are therefore generally made from high-grade steel, so that their external surface is stainless and generally requires no further treatment.

An electrode assembly comprises a measuring electrode with a head and a shank. The measuring electrode is fixed in a hole of the wall of the measuring tube in such a way that it is electrically insulated from the wall. This insulation must be very good, since the induced voltage has only small values of the order of 1 mV and its internal resistance may be on the order of 100 kΩ.

The measure of the quality of the insulation is usually the insulation resistance between the measuring electrode and the measuring tube. In dry conditions, the insulation resistance is usually of the order of 100 Ω.

It has turned out that during operation of the flow sensors, these values may deteriorate to the order of the internal resistance of the induced voltage, whereby the latter is reduced to approximately one half. Investigations by the inventors have shown that this occurs mainly when the measuring tube is colder than the ambient air. The ambient air usually leaks into a housing that encloses the electrode assemblies, even if the housing is filled with foam.

Thus, moisture will settle on the measuring tube, especially near the measuring electrodes; this may even result in the formation of water droplets. Due to capillary forces, the moisture will creep into gaps that may exist, on the one hand, between the measuring electrodes and the insulation and, on the other hand, between the insulation and the measuring tube. Furthermore, as a result of adhesion, films of moisture may form on the external surfaces of the insulation and the measuring electrodes.

SUMMARY OF THE INVENTION

It is therefore an object of the invention to avoid the reduction of the insulation resistance of the measuring electrodes by a suitable design of the electrode assembly.

To attain this object, the invention provides an electrode assembly for an electromagnetic flow sensor, said electromagnetic flow sensor comprising:
  a measuring tube made of a metallic, nonferromagnetic material
    which is lined with an insulating material, and
    having an external surface which is untreated;
  a coil assembly for generating a magnetic field passing through the measuring tube at essentially right angles and having a central axis; and
  two electrode assemblies located opposite each other on a diameter of the measuring tube perpendicular to the central axis,
said electrode assembly comprising:
  a measuring electrode having a head and a shank provided with an external thread and having a smaller diameter than the head, said measuring electrode being fitted in a hole of a wall of the measuring tube by means of an insulating body so as to be insulated from said wall, said insulating body
    having a disk-shaped portion and
    a tubular extension fitting the hole; and
  a cylindrical part made of an electrically insulating, hydrophobic material and having a bottom and a wall portion,
    said bottom having a central opening with a diameter less than the diameter of the disk-shaped portion, and
    said wall portion having an inside diameter slightly greater than the diameter of the disk-shaped portion,
    the cylindrical part, the insulating body, and a spring part, in that order, being fixed by means of a nut screwed onto the external thread of the shank, with the extension fitted in the hole, and the disk-shaped portion and the bottom being supported on the external surface of the measuring tube.

In a preferred embodiment of the invention, the ex-tension of the disk-shaped portion of the insulating body fits the central opening of the cylindrical part. Preferably, the cylindrical part is made of perfluoralkoxy.

One advantage of the invention is that, since no liquid film can form on the hydrophobic cylindrical part, a reduction of the insulation resistance is avoided and the induced voltage is not attenuated. This also prevents the occurrence of long-time insulation-resistance variations, which would result in interfering voltages that would be superposed on the induced voltage.

BRIEF DESCRIPTION OF THE DRAWINGS

The invention will become more apparent from the following description of preferred embodiments when taken in conjunction with the accompanying drawing, in which.

DETAILED DESCRIPTION OF PREFERRED EMBODIMENTS

Figure 1:
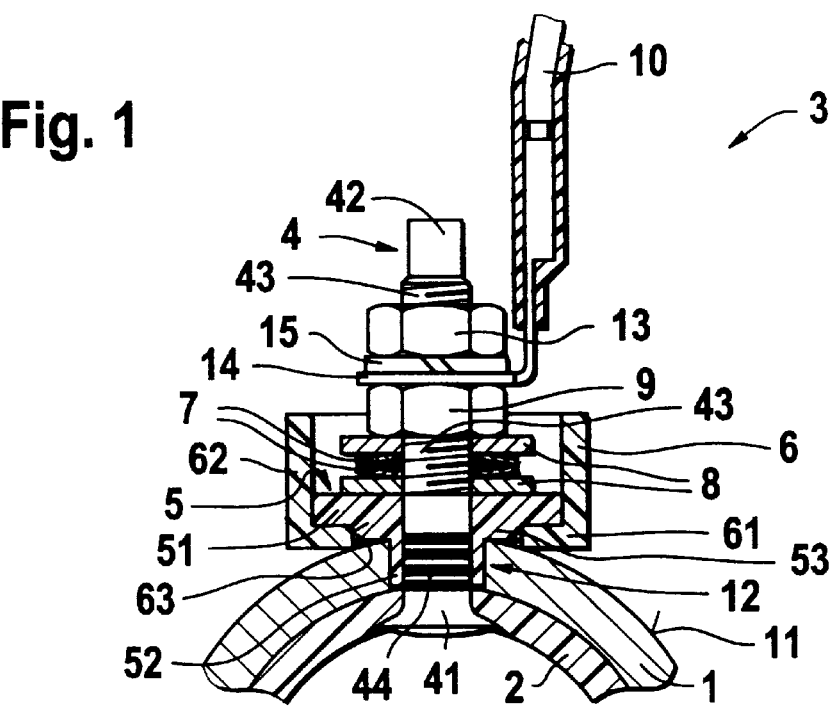
FIG. 1 is a partial section view of a first electrode assembly.

In FIG. 1, which shows the first electrode assembly in a partial section view, the electrode assembly has already been mounted in a measuring tube 1 of an electromagnetic flow sensor. Of the measuring tube 1, only a portion near the assembly is shown, and the measuring tube 1 is made of a metallic, nonferromagnetic material, particularly of high-grade steel.

The measuring tube 1 is lined with an insulating material 2 which may be any one of the materials commonly used for this purpose in electromagnetic flowmeters, i.e., polytetrafluoroethylene, hard rubber, soft rubber, etc. In the embodiment of FIG. 1, polytetrafluoroethylene is used for the insulating material 2. During the manufacture of the measuring tube 1, an external surface 11 of the tube was left untreated, i.e., bare.

An electrode assembly 3 comprises a measuring electrode 4 with a head 41 and a shank 42. The shank 42 has a smaller diameter than the head 41 and is provided with an external thread 43. The measuring electrode 4 is fitted in a hole 12 of a wall of the measuring tube 1 by means of an insulating body 5, so that measuring electrode 4 and measuring tube 1 are electrically insulated from each other.

The insulating body 5 has a disk-shaped portion 51 and a tubular extension 52 which fits the hole 12. The disk-shaped portion 51 has a diameter greater than the outside diameter of the extension 52. The extension 52 is slightly shorter than the wall of the measuring tube 1 is thick.

However, in the built-in condition of the measuring electrode 4 as shown in FIG. 1, the extension 52 reaches down to the insulating material 2, since the latter is forced against the wall of the measuring tube 1 by the head 41. It this manner, the cavity first existing between the end of extension 52 and the external surface of measuring tube 1 is filled up.

A cylindrical part 6 has a bottom 61 and a wall portion 62 and is made of an electrically insulating, hydrophobic material; perfluoralkoxy is especially suited for this purpose. The bottom 61 has a central opening 63 with a diameter less than the diameter of the disk-shaped portion 51 of the insulating body 5. The bottom 61 thus reaches under the disk-shaped portion 51 and can be pressed against the external surface 11 of the measuring tube 1.

As shown in FIG. 1, the disk-shaped portion 51 may be stepped in such a manner that a lower neck 53 has a diameter equal to the diameter of the central opening, so that the neck 53 precisely fits this opening. The thickness of the neck 53 is slightly less than the thickness of the bottom 61, so that in the finished condition, the bottom 61 is securely pressed against the external surface 11 of the measuring tube 1, as mentioned above.

The wall portion 62 of the cylindrical part 6 has an inside diameter slightly greater than the diameter of the disk-shaped portion 51, so that the latter fits the cylindrical part 6.

The electrode assembly 3 further comprises a spring part 7, in this embodiment a bilaterally acting spring element, two washers 8, and a nut 9. The components of the electrode assembly 3 are assembled as follows and in the order given:

First, the measuring electrode 4 is passed from inside through the hole 12 of the measuring tube 1, in which it holds itself. Grooves 44 formed in the lower portion of the shank 42 serve to distinguish between different materials used for the measuring electrode 4, such as high-grade steel 1.4435, high-grade steel Hast C 22, a chromium-nickel steel, a platinum-rhodium alloy with 20 atom % rhodium, or tantalum, etc.

Then, the cylindrical part 6 and the insulating body 5 are slipped over the shank 42, and the extension 52 is centered in the hole 12. Next, one of the two washers 8, then the spring part 7, and then the second washer 8 are slipped over the shank 42. Finally, the nut 9 is screwed on and tightened to subject the spring part 7 to compressive stress.

By this compressive stress, on the one hand, the bottom 61 of the cylindrical part 6 is forced against the external surface 11 of the measuring tube 1 and, on the other hand, the head 41 of the measuring electrode 4 is pulled tight against the polytetrafluoroethylene used for the insulating material 2, forming a small depression therein.

Therefore, the head 41 is tightly sealed from the liquid flowing in the measuring tube 1, and the part of the electrode assembly 3 located outside the measuring tube 1 is protected against moisture, which, for example, tends to creep from the external surface 11 of the measuring tube 1 to the measuring electrode 4. Furthermore, the hydrophobic cylindrical part 5 reliably prevents a film of condensation water from building up between the external surface 11 and the measuring electrode 4.

FIG. 1 also shows in the finished condition how the electrode assembly 3 can be connected to an electric lead 10.

This is done by means of a further nut 13, a soldering tab 14, to which the lead 10 is soldered, and a snap ring 15. These parts are fixed on the thread 43 of the measuring electrode 4 by tightening the nut 13, as shown.

Figures 2A, 2B:
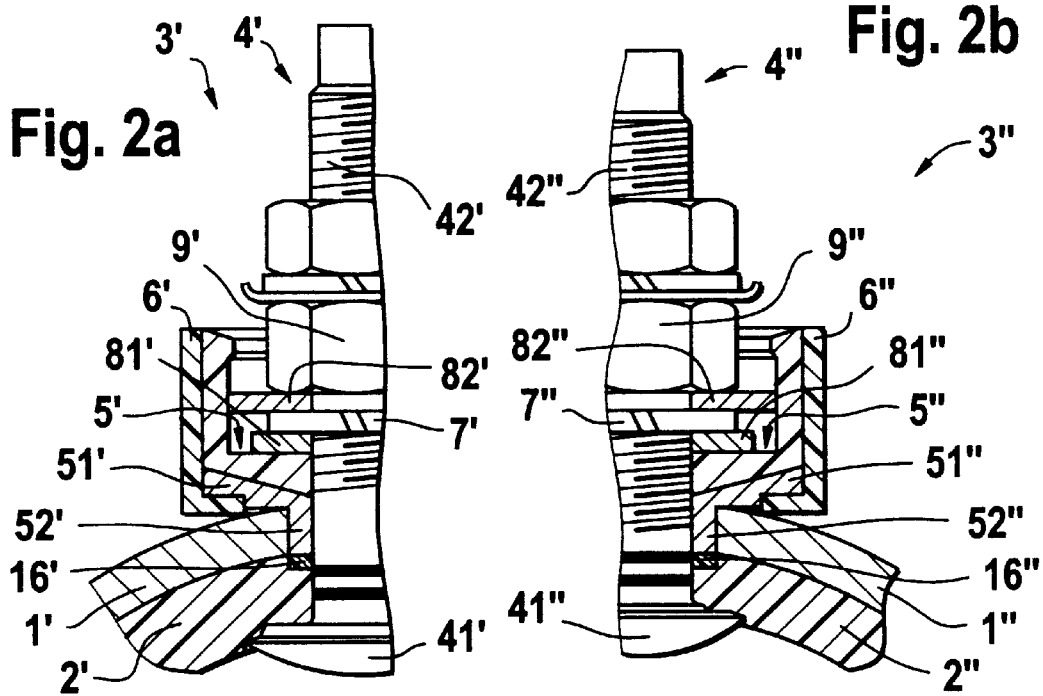
FIG. 2A is a partial section view of a first variant of a second electrode assembly.
FIG. 2B is a partial section view of a second variant of the second electrode assembly.

FIG. 2A is a partial section view of a first variant of a second electrode assembly 3'. Only the left-hand half of this variant can be seen. In FIG. 2A, only those reference characters of FIG. 1 marked by an apostrophe have been repeated which are necessary for the explanation of FIG. 2A. Only the differences from FIG. 1 will be explained.

In the variant of FIG. 2A, the insulating body 5' is adapted to the entire inner contour of the cylindrical part 6', i.e., it extends to the upper edge of the latter. As the spring part 7', a snap ring is provided instead of the bilaterally acting spring element of FIG. 1. The two types of spring parts are, of course, interchangeable.

The components of the electrode assembly 3' are assembled as follows and in the order given: First, the measuring electrode 4' is passed from inside through the hole of the measuring tube 1', in which it holds itself. Next, a washer 81', the snap ring 7', and a further washer 82' are inserted into the insulating body 5'. After that, the cylindrical part 6' and then the insulating body 5', which was prepared as just described, are slipped over the shank 42'. Finally, the nut 9' is screwed on and tightened to subject the snap ring 7' to compressive stress.

FIG. 2B is a partial section view of a second variant of a second electrode assembly 3". Only the right-hand half of this variant can be seen. In FIG. 2B, only those reference characters of FIG. 1 marked by quotation marks have been repeated which are necessary for the explanation of FIG. 2B. Only the differences from FIG. 1 will be explained again.

In the variant of FIG. 2B, the insulating body 5" is adapted to the entire inner contour of the cylindrical part 6", i.e., it extends to the upper edge of the latter. As the spring part 7", a snap ring is provided instead of the bilaterally acting spring element of FIG. 1. The two types of spring parts are, of course, interchangeable.

The components of the electrode assembly 3" are assembled as follows and in the order given: First, the measuring electrode 4" is passed from inside through the hole of the measuring tube 1", in which it holds itself. Next, a washer 81", the snap ring 7", and a further washer 82" are inserted into the insulating body 5". After that, the cylindrical part 6" and then the insulating body 5", which was prepared as just described, are slipped over the shank 42". Finally, the nut 9" is screwed on and tightened to subject the snap ring 7" to compressive stress.

The first variant of FIG. 2A differs from the second variant of FIG. 2B in that it is designed for greater nominal diameters than the second variant, so that the measuring electrode 4' is longer and the insulating material 2' is thicker.

In both variants, hard or soft rubber is used for the insulating material 2', 2". The head 4" of FIG. 2A therefore needs a gasket 16' of polytetrafluoroethylene. The gasket 16' is fitted below the extension 52' in the hole of the wall of the measuring tube 1', which hole extends a little into the insulating material 2'. It contributes to the sealing of the head 41' and the adjoining portions of the shank 42' of the measuring electrode 4'.

FIG. 2B shows a similar gasket 16"; but it can be dispensed of, if appropriate. The gasket 16" is fitted below the extension 52" in the hole of the wall of the measuring tube 1", which hole extends a little into the insulating material 2". It contributes to the sealing of the head 41" and the adjoining portions of the shank 42" of the measuring electrode 4".

What is claimed is:

1. An electrode assembly comprising:

a measuring tube made of a metallic, nonferromagnetic material having a tube wall with an external surface, the measuring tube being lined with an insulating material, the measuring tube having a hole in the tube wall;

an insulating body having a disk-shaped portion, a lower neck and a tubular extension, the tubular extension extending into the hole in the tube wall, the lower neck being disposed between the disk shaped portion and the tubular extension;

a measuring electrode having a head and a shank, the shank having an external thread and having a smaller diameter than the head, said measuring electrode being fitted in the hole of the tube wall, the head engaging the insulating material lining the measuring tube, and the shank extending through the insulating material lining, and the insulating body, thereby insulating the measuring electrode from the tube wall;

a cylindrical part made of an electrically insulating, hydrophobic material and having a bottom portion and a wall portion, said bottom portion having a central opening with a diameter, said wall portion having an inside diameter greater than the diameter of the central opening, the diameter of the central opening being less than a diameter of the disk-shaped portion of the insulating body, and said wall portion having an inside diameter slightly greater than the diameter of the disk-shaped portion of the insulating body, the lower neck of the insulating body extending into the central opening, a nut engaging the external thread of the shank of the measuring electrode; and a spring part axially penetrated by the shank and interposed between the nut and the disk-shaped portion of the insulating body, whereby the cylindrical part and the insulating body are fixed by the nut screwed onto the external thread of the shank, with the tubular extension fitted in the hole of the tube wall, and the lower neck of the insulating body and the bottom portion of the cylindrical part being supported on the external surface of the tube wall.

2. The electrode assembly as claimed in claim 1 wherein the insulating body is inserted into the cylindrical part such that the disk-shaped portion of the insulating body engages the bottom portion of the cylindrical part and is radially surrounded by the wall portion of the cylindrical part, and the tubular extension of the insulating body extends through the central opening of the bottom portion of the cylindrical part.

3. The electrode assembly as claimed in claim 2 wherein the cylindrical part is made of perfluoralkoxy.

4. The electrode assembly as claimed in claim 1 wherein the cylindrical part is made of perfluoralkoxy.

5. The electrode assembly of claim 1, wherein the tubular extension length is less than a thickness of the tube wall.

6. The electrode assembly of claim 1, wherein the insulating body further includes a cylindrical wall adjacent to an inner contour of the cylindrical part.

7. The electrode assembly of claim 1, wherein the insulating material lining the measuring tube is made of rubber.

8. The electrode assembly of claim 1, further comprising a gasket interposed between the insulating material lining the measuring tube and an end of the tubular extension.

9. The electrode assembly of claim 8, wherein the gasket is a polytetrafluoroethylene gasket.

10. The electrode assembly of claim 1, further comprising:

a first washer penetrated by the shank and abutting the insulating body;

a second washer penetrated by the shank and abutting the nut;

the spring part being disposed between the first and second washers;

whereby upon tightening the nut compressive stress is applied to the spring part.

11. The electrode assembly of claim 1, wherein the spring part includes a snap ring, and further comprising:

a first washer penetrated by the shank and abutting the insulating body;

the snap ring being penetrated by the shank and placed on the first washer;

a second washer penetrated by the shank and placed on the snap ring;

the nut abutting the second washer;

whereby upon tightening the nut compressive stress is applied to the spring part.

* * * * *

UNITED STATES PATENT AND TRADEMARK OFFICE
CERTIFICATE OF CORRECTION

PATENT NO. : 6,178,826 B1
DATED : January 30, 2001
INVENTOR(S) : Oliver Graf and Michael Schoohf It is certified that error appears in the above-identified patent and that said Letters Patent is hereby corrected as shown below:

<u>Title page,</u>
Item [73] Assignee, insert the following Assignee:

Endress + Hauser Flowtec AG,
  Reinach, Switzerland

Signed and Sealed this

Fifth Day of March, 2002

*Attest:*

JAMES E. ROGAN
*Attesting Officer*   *Director of the United States Patent and Trademark Office*